Patented June 6, 1944

2,350,818

UNITED STATES PATENT OFFICE 2,350,818

METHOD OF MAKING CRACKLE FINISH

George E. Rees, Allentown, Pa., assignor to Trojan Powder Company, Allentown, Pa.

No Drawing. Application February 8, 1940, Serial No. 317,901

2 Claims. (Cl. 117—41)

This invention relates to a crackle lacquer, the method of using, and products finished therewith.

In providing an antique appearance on furniture or the like, it is not unusual to apply a very highly pigmented pyroxylin lacquer that crackles upon the evaporation of solvents, with the production of spaced cracks or veins. Frequently the crackle finish is obtained by use of a layer of glue.

The highly pigmented pyroxylin lacquers used to produce the crackle are opaque and so obscure the grain of wood or other grained material to which the finish may be applied.

As a result, it is difficult to obtain the desired firmness of anchorage of the crackle coat and also to make a crackle finish in which there is obtained the degree of transparency desired for some purposes. Furthermore, the crackling is very difficult to control as to size and general shape of the island-like patches produced.

It is an object of the present invention to provide a crackle finish to which a later applied coat of pyroxylin lacquer or the like will adhere properly. Another object is to provide a crackle coat that adheres satisfactorily to the base coat. A further object is to provide a crackle lacquer and method of use so as to make possible the desired control of the crackling produced. Other objects and advantages will appear from the description that follows.

In general, the invention comprises a lacquer including a volatile solvent medium and starch nitrate in large proportion to the total non-volatile material of the lacquer. The invention comprises also the application of such a lacquer over a suitable base coat for the crackle lacquer. Furthermore, the invention includes the filling of the cracks developed in a starch nitrate crackle lacquer by means of a filling composition, suitably of color different from that of the crackle lacquer, as well as the application of a durable non-crackling finishing film over the crackle lacquer film.

For the purpose of illustration, the invention will be described in connection with the following specific examples of the practice of it.

As the base material having a surface to which the finish is to be applied, there is used preferably an article of wood or steel. Flexible articles such as leather, rubber or paper may be used, provided they are first given a base coat of the kind to be described, which constitutes in effect an undercoat for the crackle lacquer. Such an undercoating is advantageous, also, in finishing articles of wood or steel and for most purposes of the invention.

The undercoat hereinafter referred to as the crackle base coat is suitably one of hardness and solvent-softening property of the order of that of shellac or pyroxylin lacquer films containing a large proportion of pigment or hard transparent resinous filler. Thus, there may be used as the undercoat either shellac cut in an alcohol or a lacquer film pigmented with metallic soaps such as are commonly used as sanding sealers in wood finishing. Such a pyroxylin composition that has been used with satisfaction is Sherwin Williams #85 sanding sealer. Also, there may be used as the undercoat a lacquer comprising starch nitrate, an air-drying synthetic resin, and volatile solvents.

The crackle base coat is applied in usual manner, in the form of a solution that is brushed or sprayed, for example, upon the cleaned surface that is to be finished. The volatile solvent material is then allowed to evaporate largely, that is, the base coat is dried, so that there is produced a substantially non-tacky coating ordinarily called a dry film. This film may be smoothed, as by being sanded, or for some purposes the next coat may be applied directly. The base coat does not crackle.

The crackle lacquer coat is next applied.

The crackle lacquer contains an amount of starch nitrate that is very large in proportion to the total of substantially non-volatile materials present. For instance, the starch nitrate may constitute 60 to 90% or slightly more of the said non-volatile material. In addition to the starch nitrate and volatile solvent, there is used a modifier for the nitrostarch, as, for example, a resin or plasticizer. Such modifiers that may be used to advantage are a resinous ester of glycerin with maleic anhydride and rosin (Amberole 801), the glycerin and rosin ester known as ester gum, dammar, and an alkyd such as an ester of glycerin with phthalic anhydride and a non-drying vegetable oil (Rezyl 22-4, for instance). The above are examples of the relatively hard modifiers which have only a moderate softening effect upon the starch nitrate.

Other modifiers that may be used have a greater softening effect. These modifiers are commonly called plasticizers. They include dibutyl phthalate, tricresylphosphate, and blown castor oil, the castor oil being suitably highly blown.

The proportion of starch nitrate to modifier is greater for a modifier of large softening effect. With the so-called plasticizers of the kind described, the proportion of nitrostarch is suitably 6 to 9 times the proportion of modifier. With the harder modifiers of lower softening effect, the proportion of starch nitrate should be at least equal to that of the modifier, say 60 to 90 parts for 100 parts total of starch nitrate and modifier. As shown by the formulas given later herein, the starch and modifier constitute essentially all the non-volatile material present in the lacquer.

After application of the crackle lacquer to the article to be finished, the solvent medium is caused to evaporate as by exposure of the lacquered surface to the atmosphere, preferably an atmosphere of low relative humidity so as to avoid blushing.

To the resulting crackle finish there may be applied a glazing material, to make more conspicuous the veins in the crackle. Thus, there may be applied a material of color different from or contrasting with the adjacent material of the crackle lacquer. Such a material may be a resinous or drying oil type of finishing material suitably colored. After application in such manner as to fill the cracks or veins, the glazing material is brushed from the high areas or plateaus. The material remaining the veins is hardened in usual manner, as, for instance, by evaporation of the volatile matter originally present in the vehicle of the said material or by oxidizing the drying oil content of the material.

Either after or without the application of the glazing material described, the crackle lacquer is protected by a subsequently applied film of finishing material. This may be and suitably is a carbohydrate ester lacquer such as a pyroxylin lacquer or a starch nitrate lacquer of such low proportion of starch nitrate to modifier and such slowly evaporating solvent medium as not to crackle on drying.

By using a clear base coat, a clear crackle lacquer, and a clear protecting film, there is produced a complete crackle finish that is transparent and through which the appearance of grained wood, for example, is preserved.

The solvent in which the protective film is applied is suitably one that softens the crackle lacquer film and causes the surface blending of the finishing and crackle films while preserving the crackle effect. In other words, the solvent last applied should soften the outer surface of the crackle film but must not dissolve the crackle film more than superficially.

The crackle lacquer or the finishing lacquer may contain usual pigments and/or dyes to establish desired color or opacity. However, particularly desirable effects are obtained when the combination of finishing films is kept transparent.

For best results, the solvent medium of the crackle lacquer should have a relatviely fast evaporation rate, that is, a rate somewhat faster than is conventional for usual pyroxylin or starch nitrate spray or brush lacquer. For a crackle lacquer to be applied by spraying, for instance, the solvent medium should have an evaporation rate at least approximately as fast as the initial evaporation rate of a mixture composed of 20 parts of butyl acetate, 50 parts ethyl acetate, and 30 parts toluene. At the same time the solvent medium may have a film smoothing effect, at least towards the end of the evaporation period, substantially greater than that of ethyl acetate. With such a solvent medium, there is obtained the desired crackling with the production of a crackled lacquer film sufficiently smooth to give the desired appearance after application of the final coat of finishing material.

For best results, also, the concentration of solids (film forming ingredients) in the crackle lacquer should be high, say, 30 to 50 parts for 100 parts of the lacquer.

The invention will be illustrated in greater detail by the following formulas for crackle lacquer made in accordance with the invention.

*Formula 1*

|  | Parts |
| --- | --- |
| Starch nitrate | 23 |
| Amberole 801 (see above for identification) | 17 |
| Butyl acetate | 10 |
| Ethyl acetate | 30 |
| Toluene | 20 |
| Total | 100 |

*Formula 2*

|  | Parts |
| --- | --- |
| Starch nitrate | 30 |
| Amberole 801 (see above) | 10 |
| Butyl acetate | 10 |
| Ethyl acetate | 30 |
| Toluene | 20 |
| Total | 100 |

*Formula 3*

|  | Parts |
| --- | --- |
| Starch nitrate | 17 |
| Amberole 801 (see above) | 13 |
| Ethyl acetate | 38 |
| Toluene | 32 |
| Total | 100 |

*Formula 4*

|  | Parts |
| --- | --- |
| Starch nitrate | 17 |
| Dammar (solution containing 40% total solids) | 31 |
| Ethyl acetate | 38 |
| Toluene | 14 |
| Total | 100 |

*Formula 5*

|  | Parts |
| --- | --- |
| Starch nitrate | 17 |
| Ester gum | 13 |
| Ethyl acetate | 38 |
| Toluene | 32 |
| Total | 100 |

*Formula 6*

|  | Parts |
| --- | --- |
| Starch nitrate | 35 |
| Dibutyl phthalate or like plasticizer | 5 |
| Solvent medium of kind described | 60 |
| Total | 100 |

*Formula 7*

|  | Parts |
| --- | --- |
| Starch nitrate | 17 |
| Rezyl 22–4 (see above for identification), in 50% toluene solution | 25 |
| Ethyl acetate | 38 |
| Toluene | 20 |
| Total | 100 |

The solvent medium for the base coat crackle lacquer, and non-crackling material last applied may include the usual lacquer solvents and diluents, such as the butyl and ethyl acetate and toluene, that have been described, an alcohol such as butyl or ethyl, and ketones or the like, so long as the evaporation rate is relatively fast.

Examples of solvent mixtures that may be used with pyroxylin for the application of the base coat are the following:

Butyl acetate 33 parts, ethyl acetate 33 parts, and toluene 34 parts; or, the same volatile solvent formula plus 8 parts of tricresylphosphate.

When shellac is used as the undercoat, it is suitably applied in the usual solvents for shellac, as for example in a solution of methyl and/or ethyl alcohol, either with or without the addition of 10 to 30 per cent of butyl alcohol and other usual solvent or diluent.

With the crackle lacquer and procedure described, both primary and secondary crackling may be produced, the primary being in the form of relatively large, widely spaced veins and the secondary being in the form of smaller and more closely spaced cracks.

The sanding sealer of the pyroxylin type when used as the crackle base coat has been found to give more of the secondary crackle than does a shellac base coat. However, there may be obtained some secondary crackling even with shellac as the undercoat.

Also, the nature of the crackling as to size and general shape may be controlled by choice of composition used. The pattern obtained shows larger units in the crackling for the larger proportions of nitrostarch to modifier present.

Finally, the crackle lacquer film adheres well to the base coat and to the finishing coat when used.

It will be understood that the details given are for the purpose of illustration, not restriction, and that variations within the spirit of the invention are intended to be included in the scope of the appended claims.

What is claimed is:

1. The method of giving a crackle finish to an article and emphasizing the crackle effect obtained which comprises applying to the article a crackle lacquer including a volatile solvent medium and starch nitrate in proportion equal at least to 6 parts for 1 part of plasticizer present and adapted to crackle on evaporation of the solvent medium, causing the solvent medium to evaporate, applying over the resulting crackle finish a hardenable glazing material of color different from that of the crackle lacquer, wiping glazing material from high spots of the lacquer, and hardening remaining glazing material in the cracks of the crackled lacquer film.

2. The method of giving a crackle finish to an article which comprises applying to the article a crackle base coat, applying over the base coat a film of crackle lacquer including starch nitrate, a substantially non-volatile plasticizer for starch nitrate and a volatile solvent medium for the starch nitrate and plasticizer, and causing the volatile solvent medium to evaporate from the applied crackle lacquer, the starch nitrate constituting at least 60% of the non-volatile material of the crackle lacquer and the said volatile solvent medium consisting principally of aliphatic acetate and liquid hydrocarbon, having an initial evaporation rate at least as rapid as that of the mixture of 20 parts of butyl acetate, 50 of ethyl acetate and 30 of toluene, and having film smoothing power substantially greater than that of ethyl acetate alone.

GEORGE E. REES.